US009540994B2

(12) United States Patent  (10) Patent No.: US 9,540,994 B2
Haynes et al.  (45) Date of Patent: Jan. 10, 2017

(54) PLANETARY CRANK GEAR DESIGN FOR INTERNAL COMBUSTION ENGINES

(71) Applicant: The Trustees of the Stevens Institute of Technology, Hoboken, NJ (US)

(72) Inventors: Michael W. Haynes, Cobleskill, NY (US); El-Sayed Shaban Aziz Ramadan, Jersey City, NJ (US); Constantin Chassapis, Upper Saddle River, NJ (US)

(73) Assignee: THE TRUSTEES OF THE STEVENS INSTITUTE OF TECHNOLOGY, Hoboken, NJ (US)

( * ) Notice: Subject to any disclaimer, the term of this patent is extended or adjusted under 35 U.S.C. 154(b) by 147 days.

(21) Appl. No.: 14/634,031

(22) Filed: Feb. 27, 2015

(65) Prior Publication Data

US 2015/0247452 A1  Sep. 3, 2015

Related U.S. Application Data

(60) Provisional application No. 61/945,877, filed on Feb. 28, 2014.

(51) Int. Cl.
  *F02B 75/32*  (2006.01)
  *F16H 3/58*   (2006.01)
  *F01B 9/04*   (2006.01)

(52) U.S. Cl.
  CPC ............... *F02B 75/32* (2013.01); *F01B 9/042* (2013.01); *F16H 3/58* (2013.01); *F01B 2009/045* (2013.01)

(58) Field of Classification Search
  CPC ..... F02B 75/32; F01B 9/042; F01B 2009/045; F16H 3/58
  USPC ....................................................... 123/197.4
  See application file for complete search history.

(56) References Cited

U.S. PATENT DOCUMENTS

| 2,309,047 | A |   | 1/1943  | Culbertson |
| 3,290,950 | A |   | 12/1966 | Carlson    |
| 3,886,805 | A |   | 6/1975  | Koderman   |
| 4,026,252 | A |   | 5/1977  | Wrin       |
| 5,067,456 | A | * | 11/1991 | Beachley ............... F02B 75/32 123/197.4 |
| 5,146,884 | A |   | 9/1992  | Merkel     |

(Continued)

FOREIGN PATENT DOCUMENTS

EP   1 255 937 B1   6/2009

*Primary Examiner* — Marguerite McMahon
(74) *Attorney, Agent, or Firm* — Greenberg Traurig, LLP

(57) ABSTRACT

A gearset including an internal ring gear; a first pinion gear disposed within the internal ring gear and having teeth meshing with teeth of the internal ring gear; a disc having a central axis collinear with a central axis of the internal ring gear and a slot along a portion of a diameter of a first side thereof; a first pinion shaft having a first end, a second end, and an offset driving lug extending from the second end, the first pinion shaft extending through a hole of the first pinion gear, the offset driving lug of the first pinion shaft engaging with a first end of the slot; a second pinion gear disposed with the internal ring gear and having teeth meshing with teeth of the internal ring gear, the teeth of the second pinion gear not meshing with the teeth of the first pinion gear; a second pinion shaft having a first end, a second end, and an offset driving lug extending from the second end, the second pinion shaft extending through a hole of the second pinion gear, the offset driving lug of the second pinion shaft engaging with a second end of the slot.

18 Claims, 14 Drawing Sheets

(56) References Cited

U.S. PATENT DOCUMENTS

| | | | | |
|---|---|---|---|---|
| 5,158,046 A | * | 10/1992 | Rucker | F01B 9/026 |
| | | | | 123/197.4 |
| 5,158,047 A | * | 10/1992 | Schaal | F01B 9/02 |
| | | | | 123/197.4 |
| 5,992,356 A | | 11/1999 | Howell-Smith | |
| 6,510,831 B2 | | 1/2003 | Wiseman | |
| 2001/0035149 A1 | * | 11/2001 | Wiseman | F02B 41/04 |
| | | | | 123/197.4 |
| 2007/0215093 A1 | * | 9/2007 | Lemke | F02B 75/32 |
| | | | | 123/197.4 |

* cited by examiner

PLANETARY CRANK GEAR DESIGN FOR INTERNAL COMBUSTION ENGINES

CROSS-REFERENCE TO RELATED APPLICATION

This application is a Section 111(a) application relating to and claiming the benefit of commonly owned, U.S. Provisional Patent Application Ser. No. 61/945,877 entitled "PLANETARY CRANK GEAR DESIGN FOR INTERNAL COMBUSTION ENGINES," filed Feb. 28, 2014, the entirety of which is incorporated herein by reference.

FIELD OF THE INVENTION

The exemplary embodiments relate to an internal combustion engine with improved torque characteristics, and, more particularly, to an internal combustion engine having a planetary crank gear mechanism having a piston and a connecting rod that are caused to travel along a straight line in axial alignment with the engine's cylinder.

BACKGROUND OF THE INVENTION

Internal combustion engines, such as those used in automobile engines, are typically of the reciprocating type in which a piston moves up and down in a cylinder, transmitting its motion through a connecting rod to a crankshaft to convert heat energy into the mechanical work that drives the vehicle. Over the years, research has continued to improve the internal combustion engine, but such engines have yet to reach their full potential. Even the most modern internal combustion engines convert only one third of the energy of the consumed fuel into useful work. The rest of the energy is lost to waste heat, to the friction of moving engine parts, or to pumping air into and out of the engine. One of the major reasons for the low efficiency of internal combustion engines is the variation of the gas pressure in the cylinder, which drops dramatically as the piston travels downward. The most significant reason for this is the increase in gas volume within the cylinder as the piston descends.

In any conventional engine, the gas pressure within the cylinder is at its maximum immediately after combustion of the fuel-air mixture, when the piston is at the top of its stroke. At this point, the piston, connecting rod and crankshaft are aligned with the center line of the cylinder bore. This position is commonly known as Top Dead Center ("TDC"). Also at this time, the angle formed between the connecting rod and the crankshaft is effectively 0 degrees. Because of this alignment, no torque can be imparted to the crankshaft. As the crankshaft rotates out of the 0 degree mark, the angle between the connecting rod and the crankshaft increases, allowing the gas pressure within the cylinder to drive the piston downward with great gas force. This gas force, which is conveyed to the crankshaft via the connecting rod, in turn, drives the crank pin of the crankshaft, forcing it to rotate and produce torque. This occurs between 0 degrees and 180 degrees or one half of a complete revolution of the crankshaft. This is commonly known as the power stroke of the engine (in reality, the effective power stroke is less than 180 degrees of rotation). It is the rotational torque of the crankshaft that provides useful mechanical energy.

With most engines, this torque reaches its highest value when the crankshaft has rotated 30 to 35 degrees past TDC. At this point, the piston has traveled approximately 25% of its total stroke. Because the piston has traveled down by this amount, the gas volume within the cylinder has increased substantially. This increase in gas volume reduces the gas pressure within the cylinder by 50% or more. As the crankshaft continues to rotate, a point is reached where the angle formed between the connecting rod and the crankshaft is 90 degrees. This point is commonly considered to be the point of maximum leverage. For most engines, the point of maximum leverage, where the angle between the connecting rod and the crankshaft is 90 degrees, occurs when the crankshaft has rotated 70 to 75 degrees past TDC. At this point, the gas pressure within the cylinder has dropped to about 30% of its initial value. When the crankshaft has rotated to 90 degrees past TDC, the piston has traveled almost 60% of its entire stroke and the remaining gas pressure within the cylinder has dropped to less than 20% of its initial value. The remaining 90 degrees of the power stroke effectively produces very little torque.

It is therefore obvious that engines of this type are inherently inefficient. The average automobile engine to date is only about 20 percent efficient. The most sophisticated prototypes to date achieve an efficiency of just over 40 percent. These prototype engines are diesel engines, which, because of their much higher compression ratios, are inherently more efficient than gasoline engines. This is in itself a remarkable achievement, but these engines operate under ideal laboratory conditions. If these engines were to be put to use in everyday automobiles, their efficiency would be reduced. This still leaves a lot of room for further improvements.

Past attempts to enhance the reciprocating piston engine motion have utilized the principles of hypocycloid motion to provide a means of converting a straight line motion of a piston rod to a rotational motion. These previous attempts utilize hypocycloid gearing mechanisms to obtain strict rectilinear motion of the connecting rod to eliminate the piston side thrust. However, these prior attempts have multiple gears and counterweights, and would be difficult to assemble/disassemble. A radical design change of at least some of the components in the conventional engine would be needed in order to achieve a substantial increase in engine efficiency.

SUMMARY OF THE INVENTION

A first exemplary embodiment introduces a design change to the conventional internal combustion engine by replacing the crankshaft with a planetary crank gear mechanism. One effect of the exemplary embodiments is to increase engine efficiency by minimizing the dramatic gas volume change within the cylinder as the piston moves through the engine stroke. A second exemplary embodiment requires additional components, but allows conversion of more of the available heat energy to mechanical energy. This additional improvement is mechanical and is incorporated within the planetary crank gear mechanism. This second exemplary embodiment allows for the greatest increase in efficiency. The exemplary embodiments are applicable to any type of multiple-cylinder engines, generators, compressors, pump fields, and similar devices employing crank shafts and pistons.

In the first exemplary embodiment, a crankshaft with a planetary crank gear mechanism includes a piston and a connecting rod that are caused to travel along a straight line axially of a cylinder. As a result, this linear motion eliminates the side load on the piston because the connecting rod never pushes sideways on the cylinder wall. Friction between the piston and the cylinder wall is substantially reduced, which translates to greater mechanical energy output. Moreover, the planetary crank gear mechanism of the exemplary embodiments provides a period of much slower piston downward motion during the period of combustion to expend energy on the top of the piston for a longer time per degree of power stroke rotation. It also allows for an increase in the output torque of the planetary crank gear system, as compared to a conventional engine with similar stroke length, by about fifteen to twenty five percent.

For a further improvement in the engine efficiency, in a second exemplary embodiment, additional components are added which are driven by the pinion shafts of the planetary crank gear system. It is the combination of the original planetary crank gear mechanism with these additional components that increases the overall efficiency of the exemplary embodiments. The additional components keep all of the rotating components of the exemplary embodiments in alignment with each other, share the loads, increase the effective crank length, and provide a means to balance the motion of the reciprocating components In the second exemplary embodiment, it nearly perfectly-balanced one-cylinder engine can be achieved. With a properly developed system of this type it may be possible to achieve twice the output torque of any conventional engine of equal displacement while using the same amount of fuel.

BRIEF DESCRIPTION OF THE FIGURES

For a more complete understanding of the present invention, reference is made to the following detailed description of exemplary embodiments considered in conjunction with the accompanying drawings, in which.

DETAILED DESCRIPTION OF THE INVENTION

Figure 1:
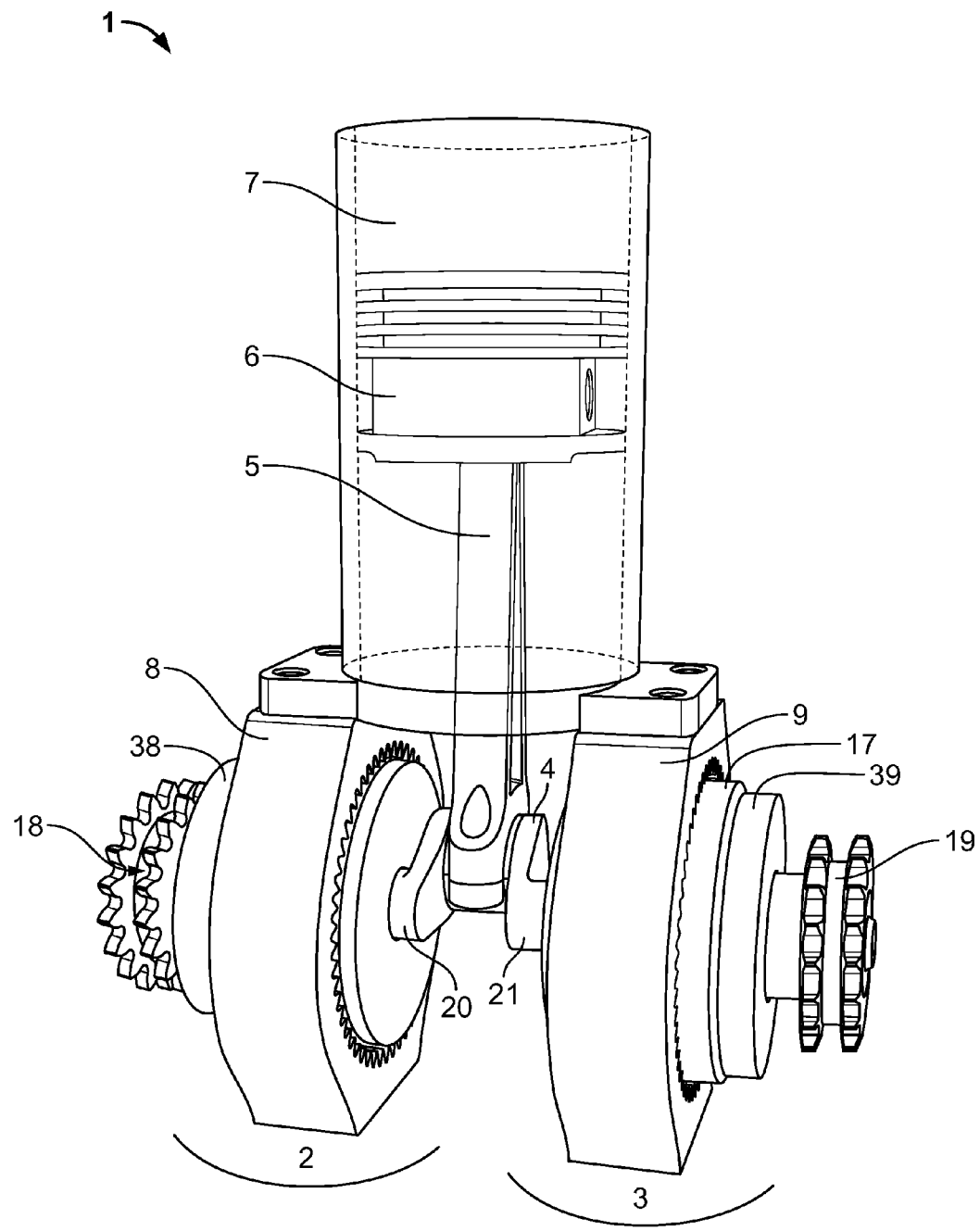
FIG. 1 is a schematic isometric view of a planetary crank gear system for a one cylinder engine of an embodiment of the present invention.
Figure 2:
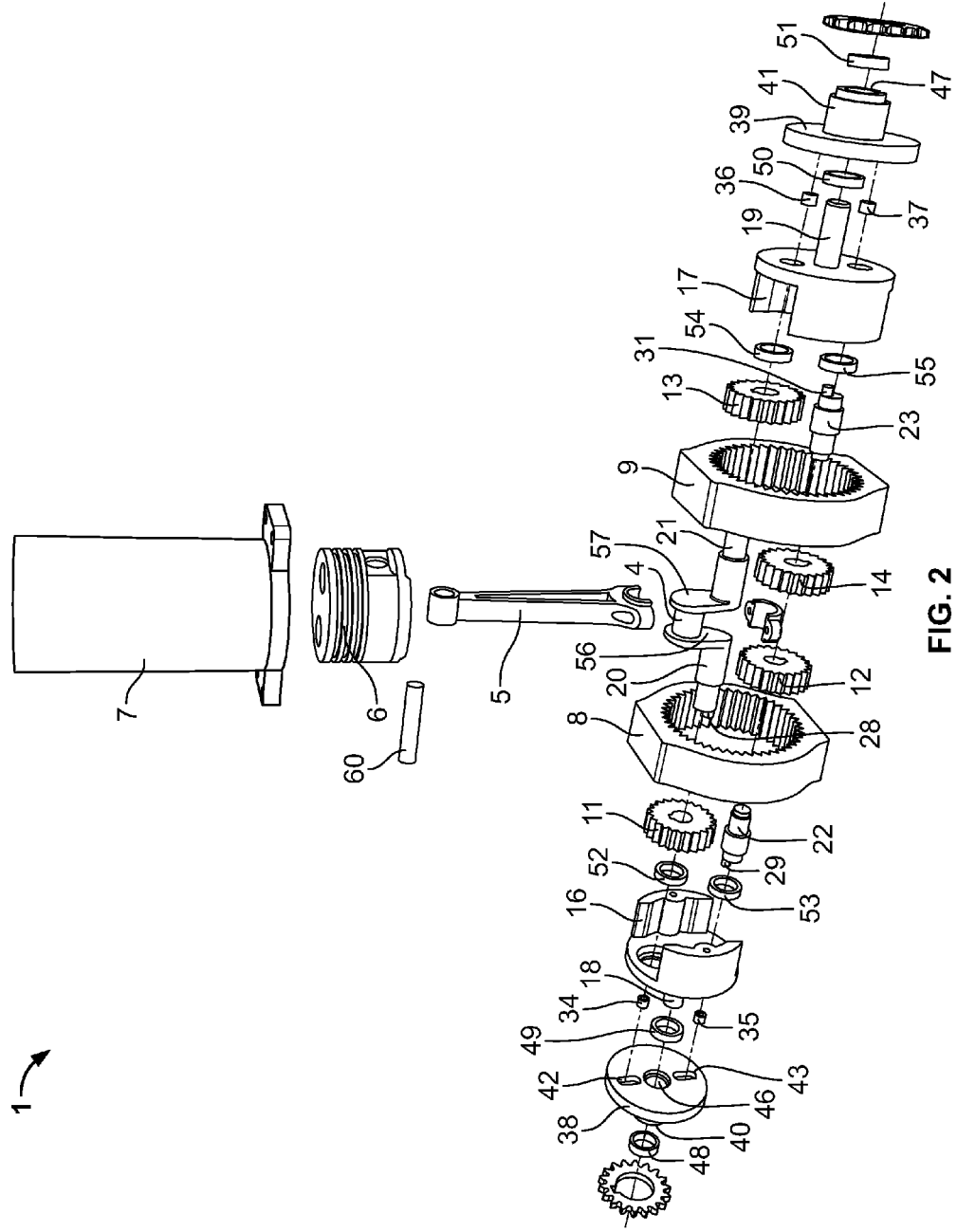
FIG. 2 is an exploded schematic view of the planetary crank gear system components of an embodiment of the present invention shown in FIG. 1.
Figure 3:
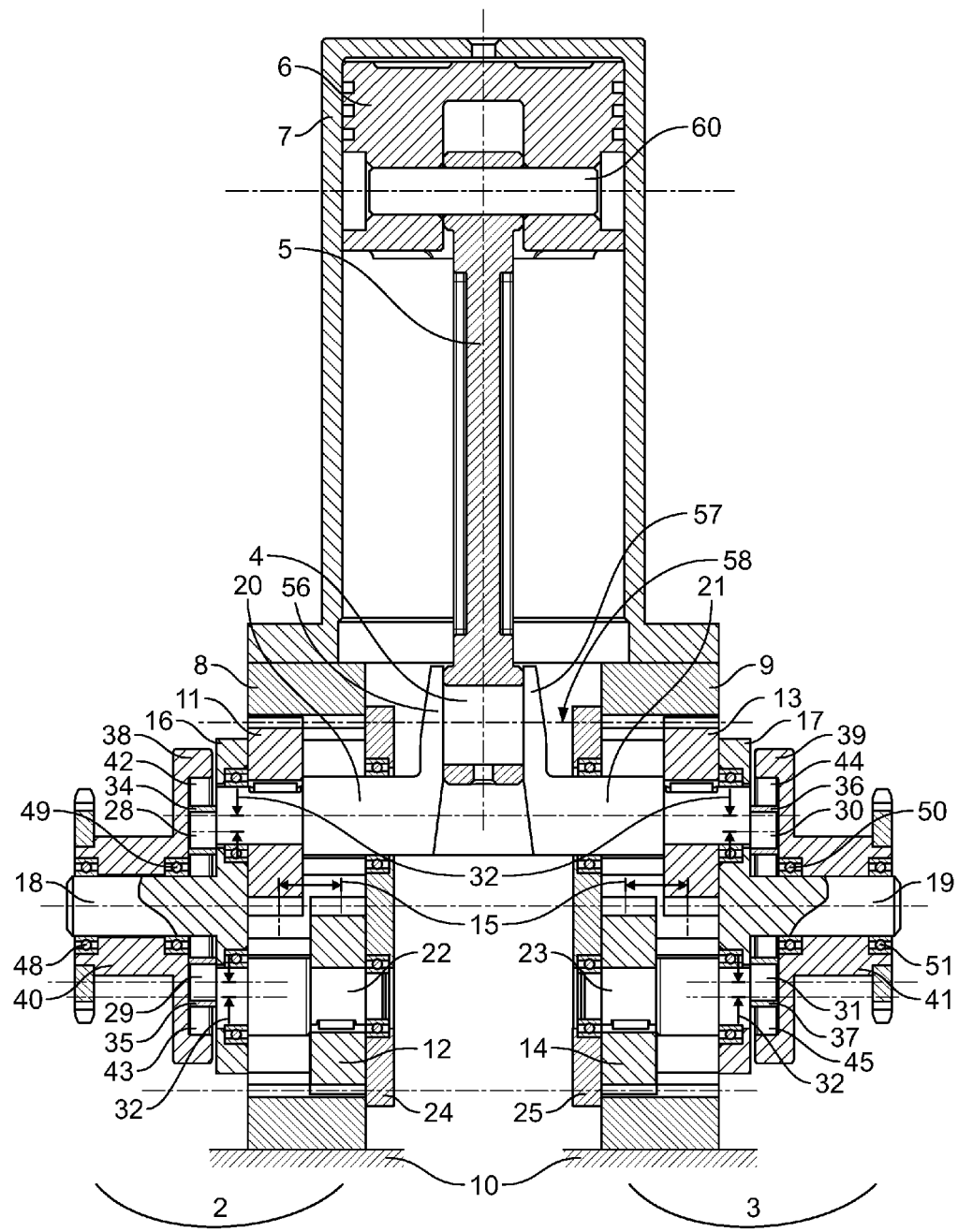
FIG. 3 is a schematic full-sectional front view of the single piston and associated planetary crank gear system assembly of an embodiment of the present invention shown in FIG. 1, and also showing the piston is at the top dead center of travel.

Referring to FIGS. 1 through 3, a planetary crank gear system 1 for a one cylinder engine according to a first exemplary embodiment includes two identical gearsets 2 (on the left side of FIG. 1) and 3 (on the right side of FIG. 1) mounted back-to-back with enough space between them to allow room for a crank pin 4. The space between the two gearsets 2, 3 is for the crank pin 4, which is journalled within one end of a connecting rod 5. The other end of the connecting rod 5 is attached to the bottom of a piston 6 by a joint 60. The piston 6 slides up and down through a cylinder head 7. Internal ring gears 8, 9 are fixed in place, such that they are attached to a crankcase 10 portion of the engine block, and do not rotate with respect to the crankcase 10. The rotating members of the planetary crank gear system 1, which are described in detail hereinafter, rotate with respect to the fixed internal ring gears 8, 9. In each gearset 2, 3, there are two planet pinion gears 11, 12 for gearset 2, and two planet pinion gears 13, 14 for gearset 3. Each planet pinion gear 11, 12, 13, 14 has equal pitch diameter and has exactly one-half of the number of teeth as the internal ring gears 8, 9 to utilize the principles of hypocycloid motion. The planet pinion gears 11, 12, 13, 14 comprising the same one of the gearsets 2, 3 are mounted 180 degrees apart from each other (e.g., planet pinion gears 11 and 12 are mounted 180 degrees apart from each other and planet pinion gears 13 and 14 are mounted 180 degrees apart from each other). The planet pinion gears 11, 12, 13, 14 are also offset axially (see FIG. 3) to prevent the gear teeth of pinion gears 11, 12, 13, 14 from interfering with each other. The planet pinion gears 11, 12, 13, 14 are mounted within conventional pinion carrier assemblies 16, 17.

The pinion carrier assemblies 16, 17 are supported by shafts 18, 19 extending from the centerline of the carrier assemblies 16, 17 on one side of each gearset 2, 3, respectively. The inside of each carrier assembly 16, 17 does not have a support shaft. The interspace between the inner faces of the carrier assembles 16, 17 allows room for the crank pin 4 to pass as it reciprocates up and down. Pinion shafts 20, 21, 22, 23 on which the planet pinion gears 11, 12, 13, 14 are mounted are fixed to these planet pinion gears 11, 12, 13, 14, respectively, and, therefore, rotate together. The pinion shafts 20, 21, 22, 23 also pass through bearings 52, 54, 53 and 55, respectively, before extending beyond the carrier assemblies 16, 17 on the outside of each unit. On the inside of the system 1, one pinion shaft 20 from the left gearset 2 and one pinion shaft 21 from the right gearset 3 are directly connected through a web of material 56 and 57 to a journal (i.e., the crank pin 4). The center line 58 of the crank pin 4 is directly in line with the pitch circle 59 of the planet pinion gear 11. This effectively forms the appearance of a conventional crankshaft comprising the pinion shaft 20, the crank pin 4, and the pinion shaft 21 (hereinafter referred to collectively as the "crankshaft"). The offset of the crank pin 4 in relation to the center line of the pinion shafts 20, 21 is only half that of a conventional engine of equal stroke; and the pinion shafts 20, 21 are used to drive the pinion gears 11, 13 and are not directly connected to the output shaft of the engine. The other two pinion gears 12, 14 in the respective gearsets 2, 3 are driven to rotate about the internal ring gears 8, 9 by the motion of the carriers 16, 17, and act as idlers which also share the load and help to balance the entire rotating assembly. The inner sides of the pinion shafts 20, 21, 22, 23 (i.e., toward the crank pin 4) are supported by covers 24, 25, which may be attached to the respective carriers 16, 17 with screws. According to the exemplary embodiment described with respect to FIGS. 1, 2 and 3, the piston 6 travels uniformly from top to bottom of the stroke and the connecting rod 5 travels in a purely linear motion. In some embodiments, the connecting rod 5 and the piston 6 can be formed as a single piece and the total weight of the piston 6 and the connecting rod 5 can be reduced. The exemplary embodiment eliminates the piston side thrust because the connecting rod 5 does not push sideways on the cylinder wall 7, thus allowing for the use of new materials in engine design (e.g., ceramics). Therefore, burning various fuels at high temperatures, increasing engine efficiency, and eliminating exhaust pollution, may result. Moreover, the linear motion of the exemplary embodiments allows for a significant tightening of the tolerances between the piston 6 and the cylinder wall 7, further increasing engine performance and reducing wear between the piston 6 and the cylinder wall 7.

Figure 4:
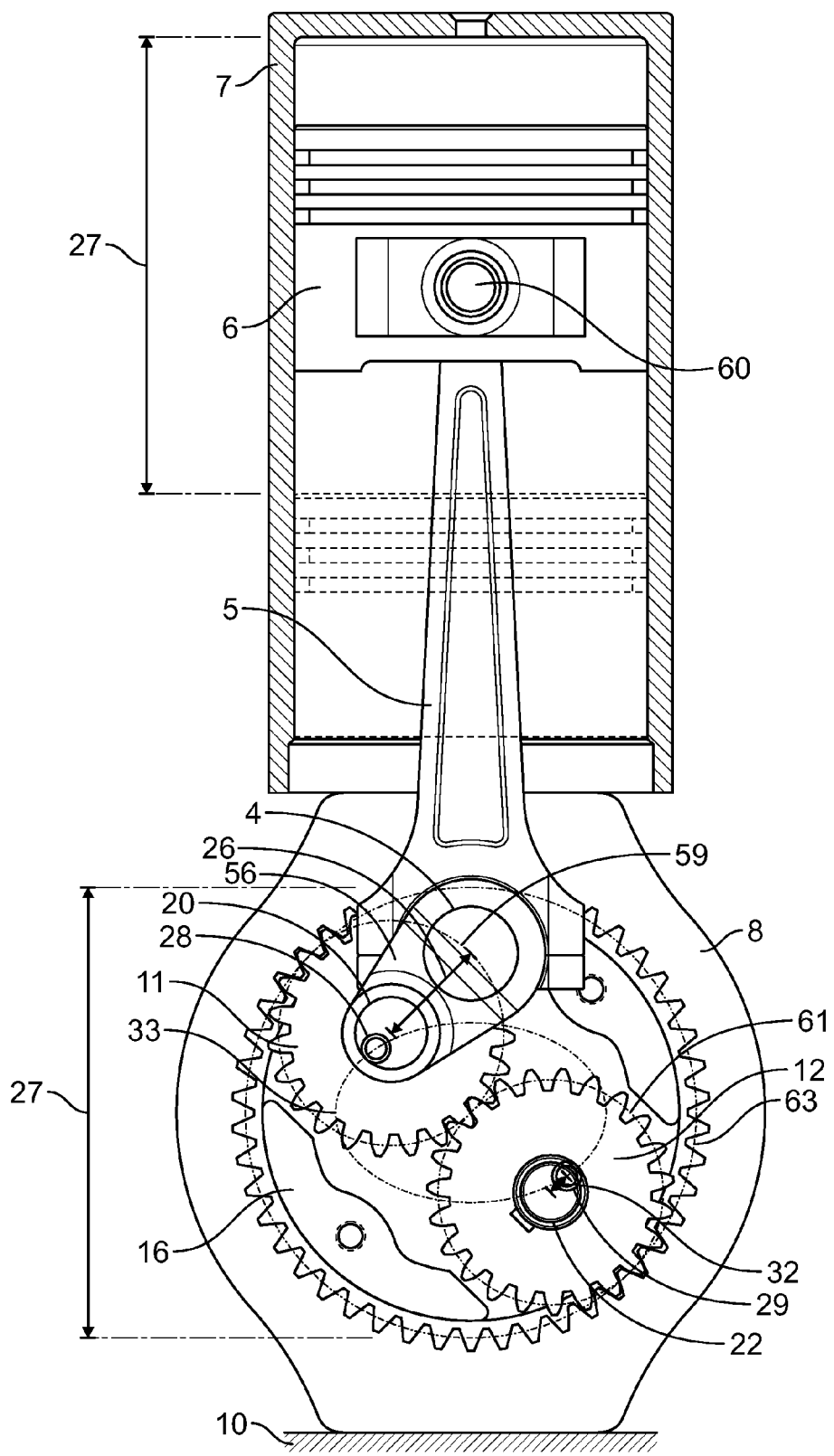
FIG. 4 is a schematic cross-sectional plan view of the mechanical movement of an embodiment of the present invention.

FIG. 4 is a schematic cross-sectional plan view of the mechanical movement of an embodiment of the present invention. Referring to FIG. 4, one planet pinion gear 11 having half the pitch diameter of the internal ring gear 8 (e.g., the diameter of pitch circle 59 of planet pinion gear 11 is equal to half the diameter of pitch circle 63 of the internal ring gear 8) is keyed to the left pinion shaft 20 at the end of the crankshaft 20-4-21 and meshes with the internal ring gear 8. The distance 26 between the center of the crank pin 4 and the center of the planet pinion gear 11 is equal to one-fourth of the stroke length 27 or the pitch radius of the planet pinion gear 11. When the piston 6 moves from the TDC to the bottom dead center ("BDC") position, indicated in FIG. 4 with the outline of the piston 6 shown in dashed lines, the planet pinion gear 11 is turned around the axis of the left pinion shaft 20. This rotation is forced by the gas force acting on the crank pin 4 through the connecting rod 5. As described above, planet pinion gear 12, which has a pitch circle 61 with equal diameter to that of pitch circle 59, acts as an idler and rotates about internal ring gear 8 in opposition to the planet pinion gear 11. Since the planet pinion gear 11 makes one revolution for each revolution of the crankshaft 20-4-21, the center of the crank pin 4 will travel up and down in a perfect straight line with a stroke length 27 equal to the pitch diameter of the internal ring gear 8. This allows for engine designs having any desired stroke length. With this arrangement, the linear distance traveled by the crank pin 4 is equal to the pitch diameter of the internal ring gear 8 or 9, which determines the engine's stroke length 27. In the exemplary embodiments, the length of the connecting rod 5 is greater than or equal to the stroke length 27.

Figure 5:
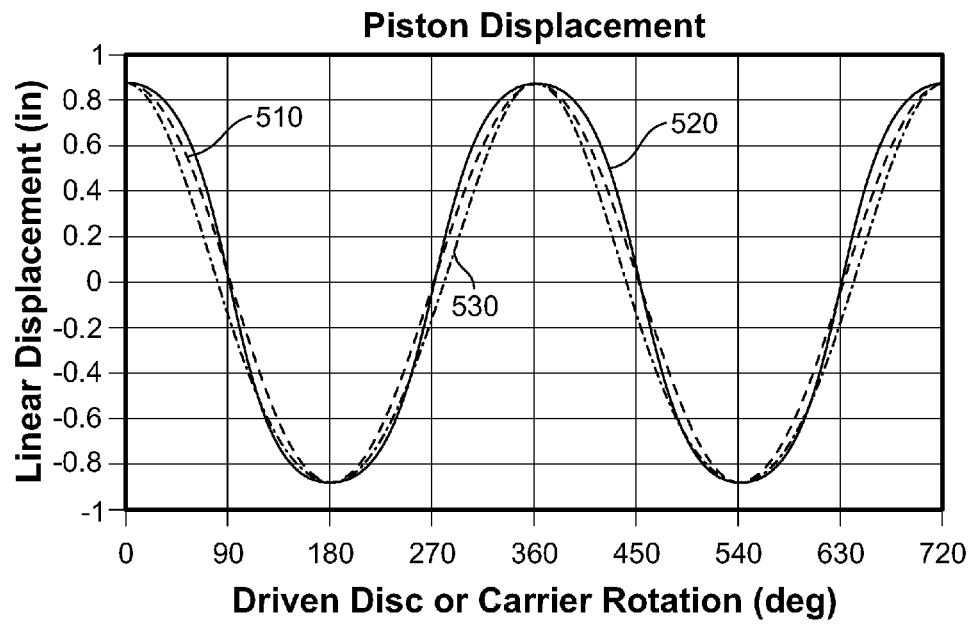
FIG. 5 is a plot of the linear displacement of the piston vs. degrees of driven disc or carrier rotation over one complete engine cycle for an embodiment of the present invention and for a conventional internal combustion engine, where both engines have equal stroke lengths.

FIG. 5 shows displacement curves of the piston 6 of the exemplary embodiments in comparison to a displacement curve for a conventional engine. Displacement curve 510 corresponds to the first exemplary embodiment described above with reference to FIGS. 1, 2 and 3. Displacement curve 520 corresponds to a second exemplary embodiment including a driving lug offset, which will be described in further detail below. Displacement curve 530 corresponds to a conventional engine. As can be seen, the piston displacement curves 510 and 520 of the exemplary embodiments show that the piston 6 travels uniformly from the top to the bottom of the stroke over a longer time than for a conventional engine of similar displacement, as shown by displacement curve 530. When the output shafts 18, 19 of the exemplary embodiment of FIGS. 1, 2 and 3 are at 90 degrees, the piston 6 has traveled exactly 50% of the stroke length 27. In a conventional engine, this is not the case because of the angle of the connecting rod: the piston travels approximately 60% of its stroke in the first 90 degrees, and the 50% stroke positions occur at approximately 81 degrees before and after TDC. This 10% difference provides a period of much slower downward motion of piston 6 during the period of combustion, thereby expending energy at the top of piston 6 for a longer time per degree of power stroke rotation of the exemplary embodiments. This effectively reduces the rate of change in gas volume during the combustion period after TDC, as also shown in FIG. 6.

Figure 6:
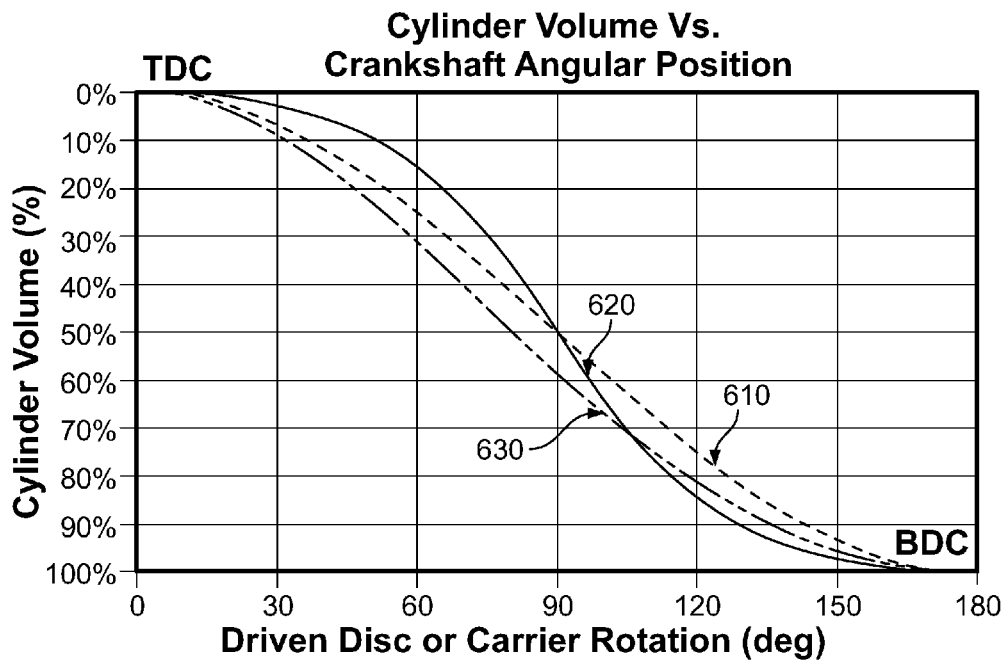
FIG. 6 is a plot of the percentage of the chamber volume above the piston face vs. degrees of driven disc or carrier rotation over one complete engine cycle for an embodiment of the present invention and for a conventional internal combustion engine, where both engines have equal stroke lengths.

FIG. 6 shows gas volume of the combustion chamber for various cylinders. Volume curve 610 corresponds to the first exemplary embodiment described above with reference to FIGS. 1, 2 and 3. Volume curve 620 corresponds to the second exemplary embodiment including a driving lug offset. Volume curve 530 corresponds to a conventional engine. The curves shown in FIG. 6 demonstrate a much slower rate of the change in gas volume of the combustion chamber for the exemplary embodiments than for the conventional engine. For example, FIG. 6 compares the change in gas volume of the combustion chamber at 60 degrees after TDC for an engine according to the exemplary embodiments (15% with driving lug offset, as shown in displacement curve 520, and 25% without driving lug offset, as shown in displacement curve 510) with the change in gas volume for the conventional engine at the same position (32%). This difference in the gas volume change between the two types of engines has a significant effect on the gas pressure and engine performance. Because the piston has traveled a smaller linear distance within the cylinder as the crankshaft approaches its point of maximum leverage at 90 degrees, and, therefore, continues to be subject to a greater force from gas pressure within the cylinder, the torque output of an engine according to the exemplary embodiments is generally higher than that of a conventional engine of similar displacement.

Figure 7:
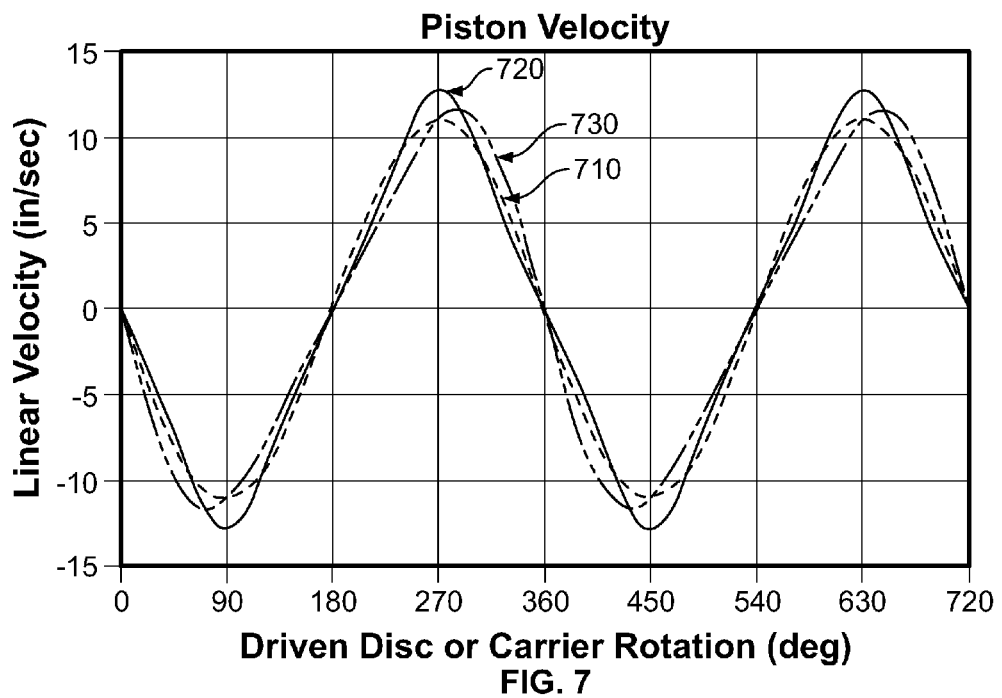
FIG. 7 is a plot of the linear velocity of the piston vs. degrees of driven disc or carrier rotation over one complete engine cycle for an embodiment of the present invention and for a conventional internal combustion engine, where both engines have equal stroke lengths.

FIG. 7 shows curves of piston velocity for various cylinders. Velocity curve 710 corresponds to the first exemplary embodiment described above with reference to FIGS. 1, 2 and 3. Velocity curve 720 corresponds to the second exemplary embodiment including a driving lug offset. Velocity curve 730 corresponds to a conventional engine. It can be seen that, at TDC and BDC, the piston velocity is zero for both the exemplary engines and a conventional engine. This is because the piston 6 reverses direction at TDC and BDC in order for the velocity to go from a "plus" to a "minus". The maximum velocity of piston 6 in the conventional engine occurs at about 74 degrees before and after TDC, not at 90 degrees before and after TDC as in the exemplary embodiments. The asymmetric velocity profile of the conventional engine is a result of the geometry characteristics which cause the dissymmetry in piston motion. Such dissymmetry does not occur in the exemplary embodiments, in which, when the carrier assembly 16 and 17 is rotated, the velocity of the reciprocating motion of the crank pin 4 follows a sinusoidal pattern. At the 0 degree of rotation (i.e., in the TDC position), the crank pin 4 is stationary. As the carrier assemblies 16, 17 are rotated, the crank pin 4 begins to accelerate, reaching a maximum linear velocity at 90 degrees past TDC. With the continued rotation of the carrier 16 and 17 from the 90 degrees position to the BDC at 180 degrees, the crank pin 4 decelerates until it is again stationary. There are no abrupt starts and stops involved with the linear motion of the crank pin 4 in the exemplary embodiments, allowing for smooth operation at high RPMs. The effective RPM range of an engine using the exemplary embodiments is similar to that of conventional engines.

Figure 8:
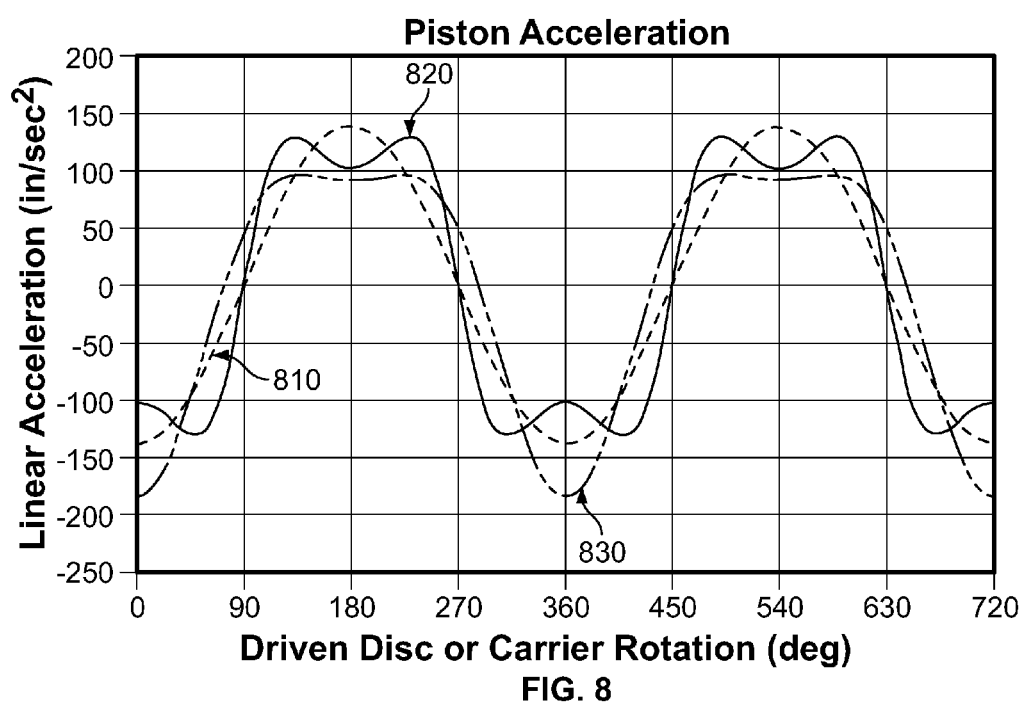
FIG. 8 is a plot of the linear acceleration of the piston vs. degrees of driven disc or carrier rotation over one complete engine cycle for an embodiment of the present invention and for a conventional internal combustion engine, where both engines have equal stroke lengths.

FIG. 8 shows curves of piston acceleration for various cylinders. Acceleration curve 810 corresponds to the first exemplary embodiment described above with reference to FIGS. 1, 2 and 3. Acceleration curve 820 corresponds to the second exemplary embodiment including a driving lug offset. Acceleration curve 830 corresponds to a conventional engine. It can be seen that the piston acceleration and deceleration of the conventional engine are greater in the top half of the crankshaft rotation than in the bottom half, because the connecting rods are not infinitely long, resulting in a non-sinusoidal motion. At TDC and BDC, the piston is reversing its direction of motion, so piston velocity is zero, but that velocity is changing very rapidly, producing large values of acceleration. This explains why failure of the connecting rod of a conventional engine often occurs at the point. As shown by acceleration curves 810 and 820, in the exemplary embodiments, the maximum acceleration found at TDC and BDC are more symmetric. Further, acceleration curve 820 shows that the driving lug offset of the second exemplary embodiment, which will be described in further detail below, can be used to optimize the peak acceleration at TDC and BDC, moving those two peaks closer to the same value.

Figure 9:
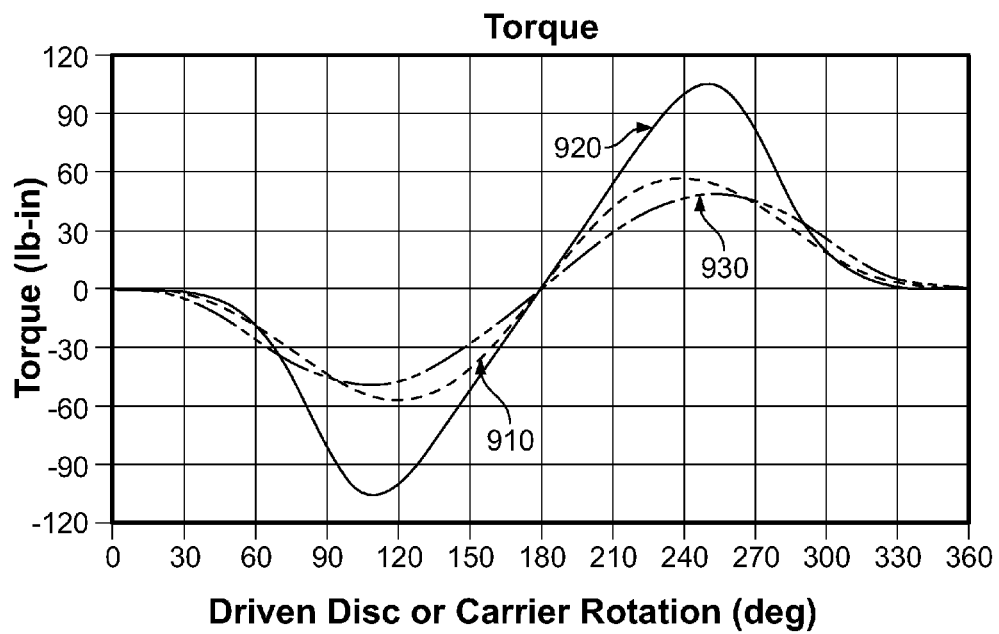
FIG. 9 is a plot of the torque comparison of an embodiment of the present invention vs. a conventional internal combustion engine over one complete engine cycle for an initial force that decreases with the piston displacement, where both engines have equal stroke lengths.

FIG. 9 is a plot comparing the torque generated by the exemplary embodiments to that generated by a conventional engine, over one complete engine cycle, for an initial force of 100 pounds that decreases with the piston displacement, where both engines have equal stroke. Torque curve 930 indicates the torque generated by a conventional engine. The planetary crank gear system 1 of the first exemplary embodiment increases the output torque of the supported shafts 18 and 19 of the planetary assemblies 16 and 17 by about sixteen percent over the conventional engine of similar stroke length by themselves, as shown by torque curve 910. A greater increase in engine efficiency can be obtained through the use of the additional components (driving lugs 28, 29, 30 and 31) in the planetary crank gear system 1 of the second exemplary embodiment. These additional components, which are described more fully herein below, are driven by the pinion shafts 20, 21, 22, 23 from the planetary crank gear system 1. Torque curve 920 of FIG. 9 illustrates the torque generated by the second exemplary embodiment, which incorporates a driving lug offset 32. As can be seen, the generated torque is increased by about 115% over the conventional engine of similar stroke length.

Figure 10:
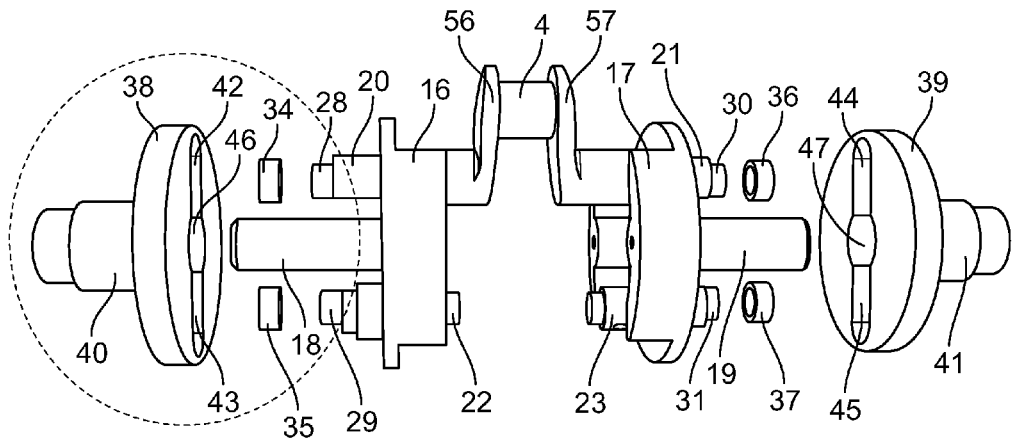
FIG. 10 is a schematic exploded isometric view of the additional components of the exemplary planetary crank gear system shown in FIG. 1 which are driven by the pinion gear shafts of the planetary crank gear mechanism in an embodiment of the present invention.
Figure 11:
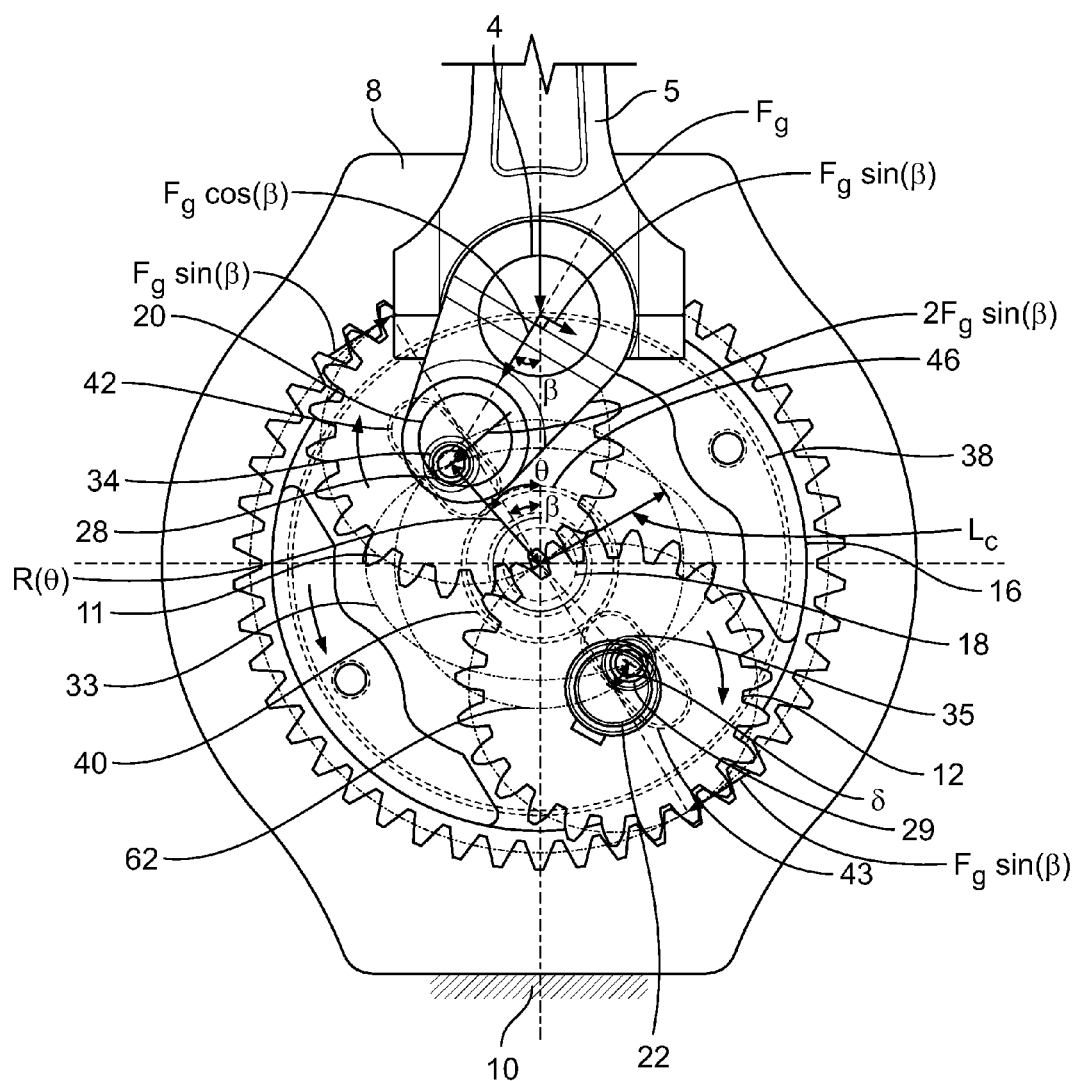
FIG. 11 is a schematic illustration of the driving lug path of an embodiment of the present invention over one complete planetary carrier revolution.

FIGS. 3, 10 and 11 illustrate the additional components introduced in the enhanced planetary crank gear system 1 of the second exemplary embodiment. An additional mechanism, discussed hereinafter, is added to the planetary crank gear system 1 described above with reference to FIGS. 1-3 to increase further the overall efficiency of the exemplary embodiments. For simplicity, only the left side, including pinion shafts 20, 22, encircled in FIG. 10, will be described herein, since the right side, including pinion shafts 21, 23 is essentially a mirror image of the left side. Extending from the end of the pinion shafts 20 and 22 are two smaller diameter stub shafts, which will be referred to herein as driving lugs 28 and 29. The position of the center line of the driving lug 28 is offset by driving lug offset 32 from the center line of the pinion shaft 20, as shown in FIG. 3. The direction of the driving lug offset 32 is approximately opposite the crank pin journal 4. When the pinion shaft 20 rotates, the driving lug 28 orbits around the center of rotation of the pinion shaft 20. As the entire planetary crank gear system 1 is rotated 360 degrees, the path of the driving lugs 28 and 29 is an ellipse 33, as shown in FIG. 4 and FIG. 11. The X-axis (top to bottom length) of this ellipse is the small axis, while the Y-axis (left to right) is the large axis. The dimensions of the ellipse 33 are determined by the stroke of the crank pin 4 (i.e., engine stroke 27) and the size of the driving lug offset 32. Sliding bearings 34 35, 36 and 37 are fitted over the driving lugs 28, 29, 30 and 31.

Still referring to FIGS. 3, 10 and 11, the driving lugs 28 and 29, with corresponding sliding bearings 34 and 35, are then indexed into slots 42 and 43 in a disc 38, which correspond to slots 44 and 45 on the opposite side of the planetary crank gear system 1. The disc 38 is then driven by the driving lugs 28, 29. The disc 38 is centered over the planetary carrier support shaft 18 and has an output shaft 40 extending from the side opposite the slots 42, 43. The side of the disc 38 having slots 42, 43 across its face also has a hole 46 in its center. The central hole 46, which corresponds to central hole 47 in disc 39, extends into the shaft portion of the disc 38 to allow room for bearing 49, which supports the planet carrier assembly 16, and which correspond to bearing 50 supporting the planet carrier assembly 17. The outside of the shafts 40 and 41 are supported by bearings 48 and 51, respectively, which are mounted in the lower crankcase 10 portion of the engine block. The power output torque of the engine is taken from the shaft 40. Since there are two complete planetary gearsets 2, 3 mounted back-to-back, as shown in FIG. 1, there are also the two driven discs 38, 39 and the two output shafts 40, 41.

The exemplary embodiments include a shaft (not shown) extending from both ends of the engine block. In the case of the exemplary embodiments, both output shafts (not shown) are independent parts. For several reasons, both of these shafts need to be synchronized with each other. The first and most important reason is to keep all of the rotating components in alignment with each other. The second reason is to allow both assemblies (i.e., gearsets 2 and 3) to share the work load. The third reason, in the case of a single cylinder engine, is to provide a means to balance the motion of the reciprocating components. Balancing of the rotating components can be achieved within the gearsets 2 and 3 alone.

A gear-driven shaft (not shown), commonly known as a jackshaft, is mounted between the front and back output shafts adjacent to the gearsets 2 and 3. In the case of a single cylinder design, two shafts are needed. For balancing purposes, these shafts should rotate in opposite directions with respect to each other. Also, both of these shafts should rotate at the same speed as the output shafts 40, 41. Each of these shafts has a counterweight attached to them. The counterweights are used to counterbalance the action of the reciprocating components within the engine. With this design, it should be possible to achieve a nearly perfectly-balanced one-cylinder engine. In the case of a properly-designed engine with an even number of cylinders, no counter balancing should be required. In this case, a single shaft may be used.

Referring to FIGS. 4, 5, 6 and 11, the design of the exemplary embodiments allows for a variable leverage point between the planetary carrier assembly 16 and the output shaft 40. In the exemplary embodiments, this is accomplished through the combination of offset driving lugs 28, 29, 30, 31 on the pinion shafts 20, 21, 22, 23 and the slotted driven discs 38, 39. As the planetary crank gear system 1 is rotated from the 0 degree position to the 90 degree position, the effective leverage angle formed between the driving lugs 28, 29, 30, 31 and the center of rotation of the slotted discs 38, 39 increases from a minimum amount to a maximum amount. During this phase of operation, the driving lugs 28, 29, 30, 31 travel toward the outer edge of the driven discs 38, 39. This, in turn, increases the amount of leverage between the driving lugs 28, 29, 30, 31 and the center line of rotation of the driven discs 38, 39. The purpose of this is to increase the effective moment arm provided by the crankshaft to provide a far greater output torque up to and also beyond the 90 degree position of rotation as compared to a conventional engine of similar stroke length, as shown in FIG. 9.

Torque generated at any given time by the second exemplary embodiment, including offset driving lugs 28, 29, 30, 31, may be expressed in terms of the gas force $F_g$; the angle $\beta$ between the vertical center line of the piston and the line connecting the center of the crank pin 4 to the center of the driven pinion shafts 20 and 22; the angle $\theta$ between the vertical center line of the piston 6 and the line connecting the center of the internal ring gears 8, 9 to the center of the driving lugs 28, 30; the crank length $L_c$ (e.g., the radius of the pitch circles 59 and 61); the linear offset distance $\delta$ (e.g., the driving lug offset 32); and the current ellipse radius distance $R(\theta)$. FIG. 11 illustrates these parameters in relation to the elements of the second exemplary embodiment. The torque, as plotted in FIGS. 9 and 15, may be calculated according to the expression: Torque=$F_g*\{2*R(\theta)*\sin(\theta)+[L_C+\delta]*\sin(\beta)\}$.

Figure 12:
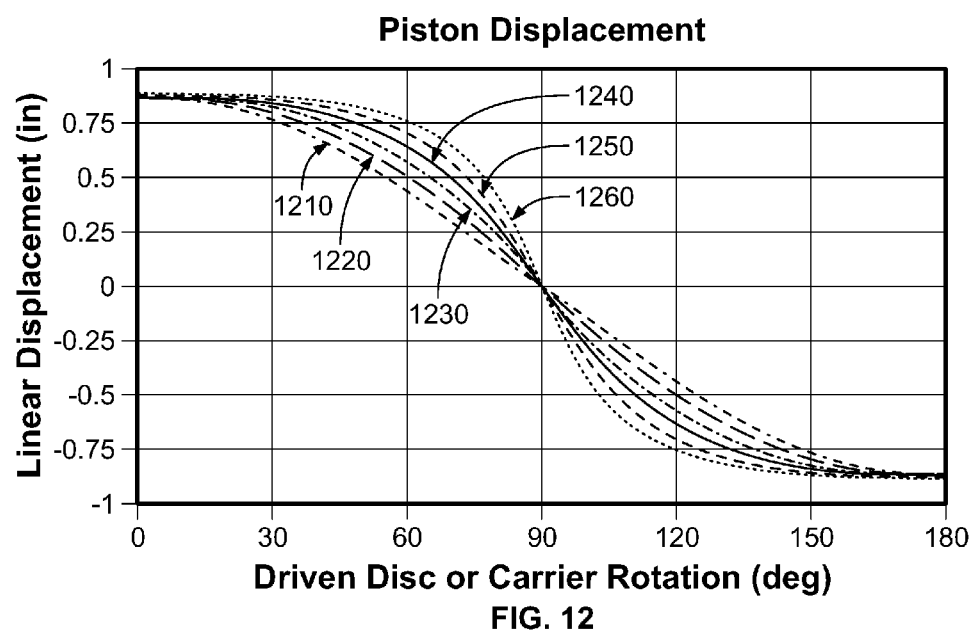
FIG. 12 is a plot showing the effect of different driving lug offsets on the piston displacement in an embodiment of the present invention.

As described above, in one exemplary embodiment, a driving lug offset 32 is present between the center lines of pinion shafts 20, 21, 22 and 23 and the respective center lines of driving lugs 28, 29, 30 and 31. With no offset, as in the first exemplary embodiment described above, the center lines of the pinion shafts 20, 21, 22 and 23 will be coincident with the respective center lines of driving lugs 28, 29, 30 and 31. In such an embodiment, the path of the driving lugs 28, 29, 30 and 31 is a circle 62 with diameter equal to half of the stroke length 27. In this embodiment, the maximum moment arm is equal to one-fourth of the stroke length when the output shafts are at 90 degrees past TDC. As described above with reference to the second exemplary embodiment, to increase the effective moment arm offered by the crankshaft 20-4-21, the center lines of the driving lugs 28, 29, 30 and 31 are moved away from the respective center lines of the pinion shafts 20, 21, 22 and 23 by the desired driving lug offset 32. FIG. 12 shows the effect of different values of the driving lug offset 32 on displacement curves for piston 6 while traveling from TDC to BDC. As the entire planetary crank gear assembly 1 rotates, the path of the driving lugs 28, 29, 30 and 31 is an ellipse 33, as shown in FIG. 11. The length of the semi-major axis of this ellipse 33 is equal to the sum of the crank length 26 and the driving lug offset 32, represents the effective moment arm provided by the crankshaft 20-4-21.

The curves shown in FIG. 12 correspond to varying values of $\lambda$, which represents the size of the driving lug offset 32 as a ratio to the crank length 26, and which is determined by dividing the driving lug offset 32 by the pitch radius of the planet pinion gears 11, 12, 13 and 14. Curve 1210 shows linear displacement of the piston 6 plotted against rotation of the carrier assemblies 16 and 17 for a value $\lambda=0$ (i.e., for the first exemplary embodiment in which no driving lug offset 32 is used). Curves 1220, 1230, 1240, 1250 and 1260 show linear displacement of the piston 6 plotted against rotation of the carrier assemblies 16 and 17 for varying values of $\lambda$ in the second exemplary embodiment, in which a driving lug offset 32 is used. Curve 1220 corresponds to a value $\lambda=0.1$, curve 1230 corresponds to a value $\lambda=0.2$, curve 1240 corresponds to a value $\lambda=0.3$, curve 1250 corresponds to a value $\lambda=0.4$, and curve 1260 corresponds to a value $\lambda=0.5$. As can be seen in FIG. 12, the rate of change of gas volume within the cylinder 7 varies according to the position of the piston 6, and is a function of the driving lug offset 32. Thus, the size of the driving lug offset 32 may be used to control the rate of change of the volume of the compressed gas in a combustion volume above the face of the piston 6 to produce more rotary power during the combustion period after TDC.

Figure 13:
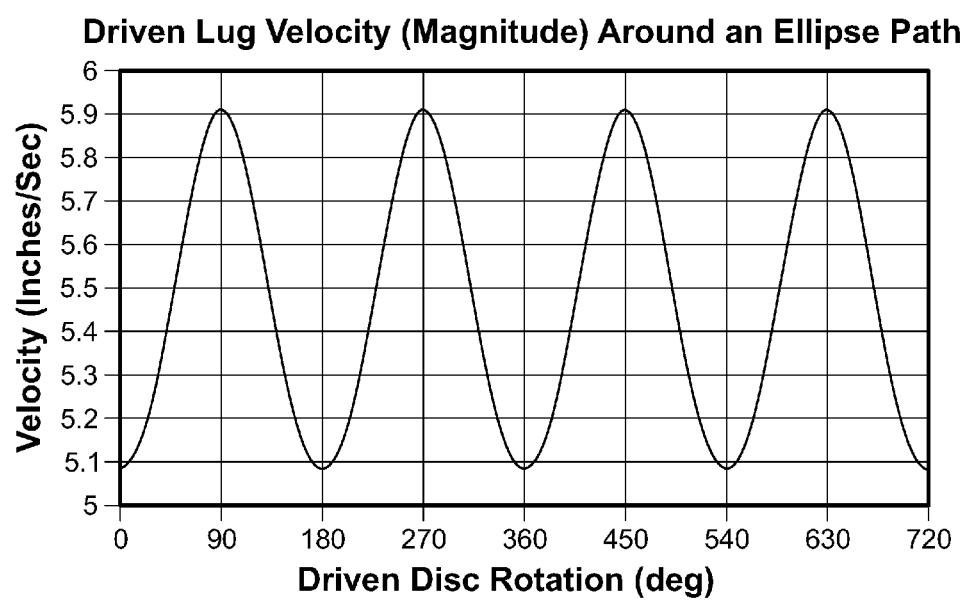
FIG. 13 is a plot of the magnitude of the driving lug velocity around an elliptical path of an embodiment of the present invention over one complete engine cycle.

Referring to FIG. 13, another factor also helps to improve the power output with the second exemplary embodiment described above. This is the fact that the rotational relationship between the planetary carrier assembly 16 and the driven disc-output shaft 38 is not uniform. If the driven disc 38 is rotated at a constant angular velocity, the angular velocity of the planetary carrier assembly 16 will fluctuate up and down. This fluctuation in angular velocity occurs two times per revolution. The amount of this fluctuation is directly related to the amount of offset 32 of the driving lugs 28, 29. When the driven disc 38 is rotating at a constant speed, the speed of the planetary carrier assembly 16 is at its slowest at the 0 degree (i.e., TDC) position and the 180 degrees (i.e., BDC) position. The speed of the planetary carrier assembly 16 is at its highest value at the 90 degrees and 270 degrees positions. The average speed of the planetary carrier assembly 16, which occurs four times per revolution, is equal to the speed of the driven disc 38.

Figure 14:
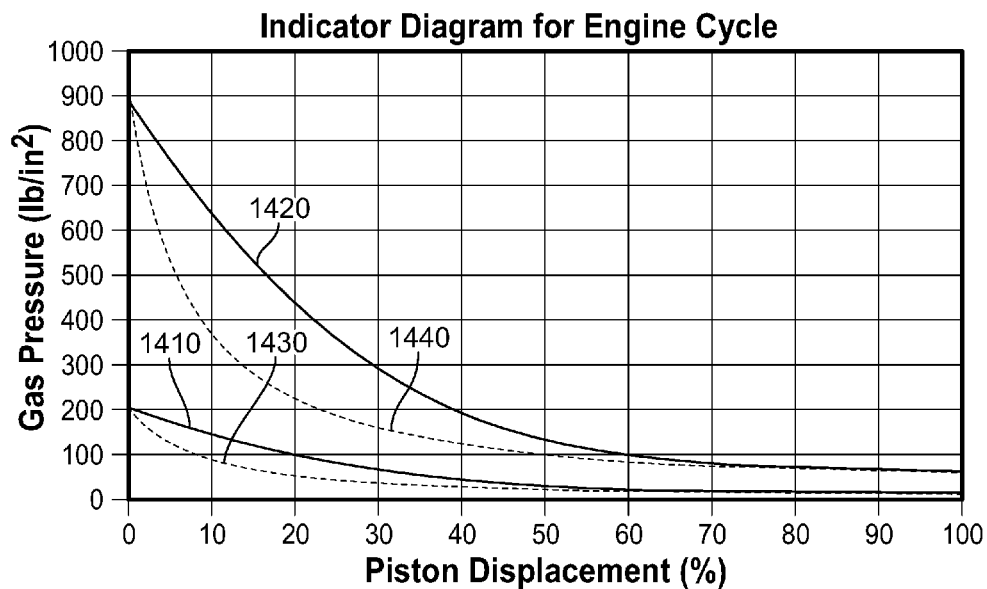
FIG. 14 is a theoretical gas pressure diagram of an embodiment of the present invention vs. a conventional internal combustion engine over one complete engine cycle, where both engines have equal stroke lengths.

FIG. 14 shows the compression and combustion pressure in the second exemplary embodiment as compared to those of a conventional engine. Curve 1410 shows compression pressure for the second exemplary embodiment. Curve 1420 shows combustion pressure for the second embodiment. Curves 1430 and 1440 show compression pressure and combustion pressure, respectively, for a conventional engine. It may be seen that the compression and the combustion pressures in the second exemplary embodiment are greater before and after the TDC than those of a conventional engine of similar stroke length. The same may be true of the first exemplary embodiment. The greater gas pressure helps to generate greater gas force exerted on the top of the piston in the exemplary embodiments.

Figure 15:
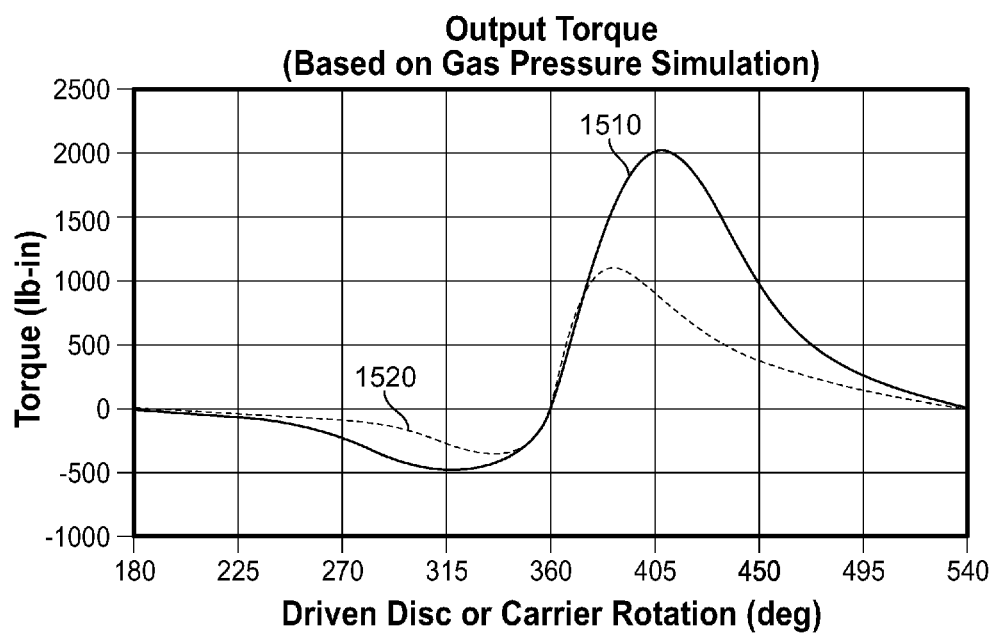
FIG. 15 is a plot of the output torque of an embodiment of the present invention vs. a conventional internal combustion engine over one complete engine cycle, where both engines have equal stroke lengths.

FIG. 15 shows torque output in the second exemplary embodiment as compared to that of a conventional engine. Curve 1510 shows torque output of the second exemplary embodiment, while curve 1520 shows torque output of a conventional engine. It may be seen that, as a result of the greater compression and combustion pressures shown in FIG. 14, the mean torque output from the output shafts 40, 41 over one cycle is 83% greater for the second exemplary embodiment for the conventional engine. Achieving twice the power output torque of any conventional engine of equal displacement while using the same amount of fuel is obtainable.

Figure 16B:
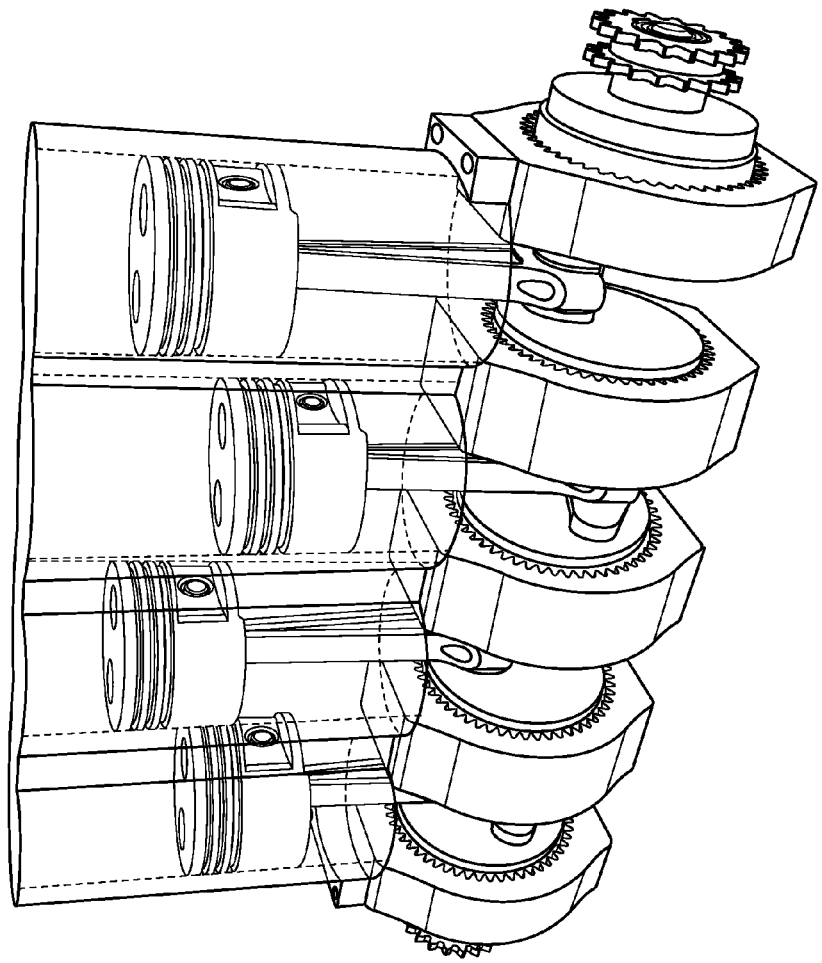
FIGS. 16(A) through 16(G) are schematic illustrations of engine layouts for embodiments of the present invention.
Figure 16A:
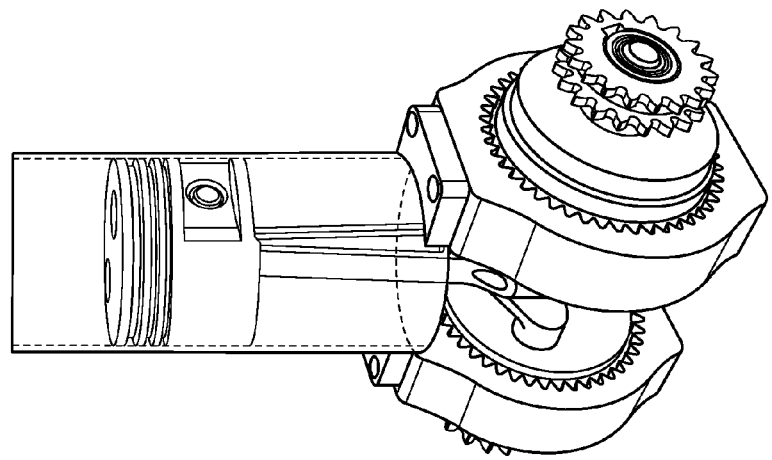
Figure 16C:
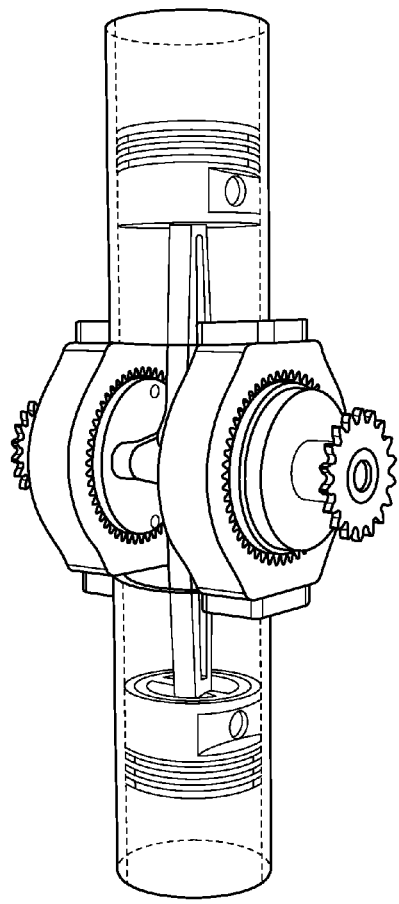
Figure 16D:
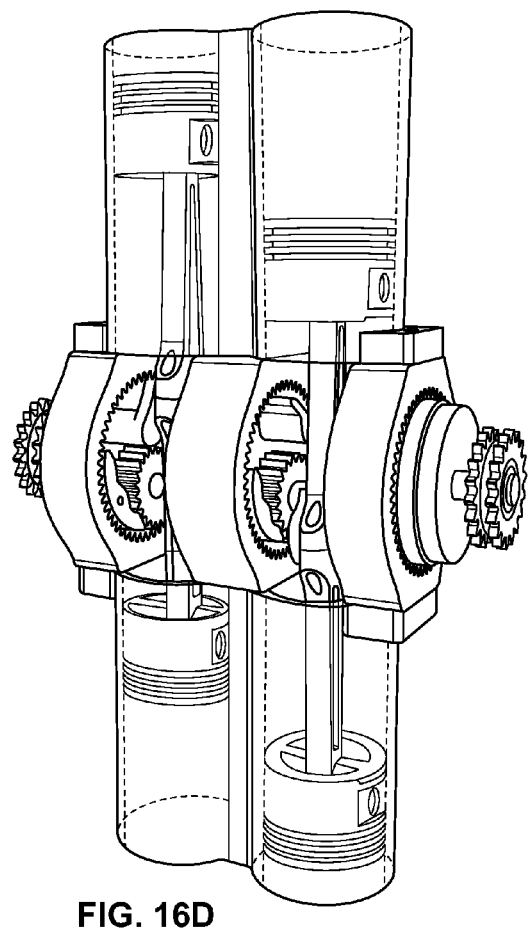
Figure 16E:
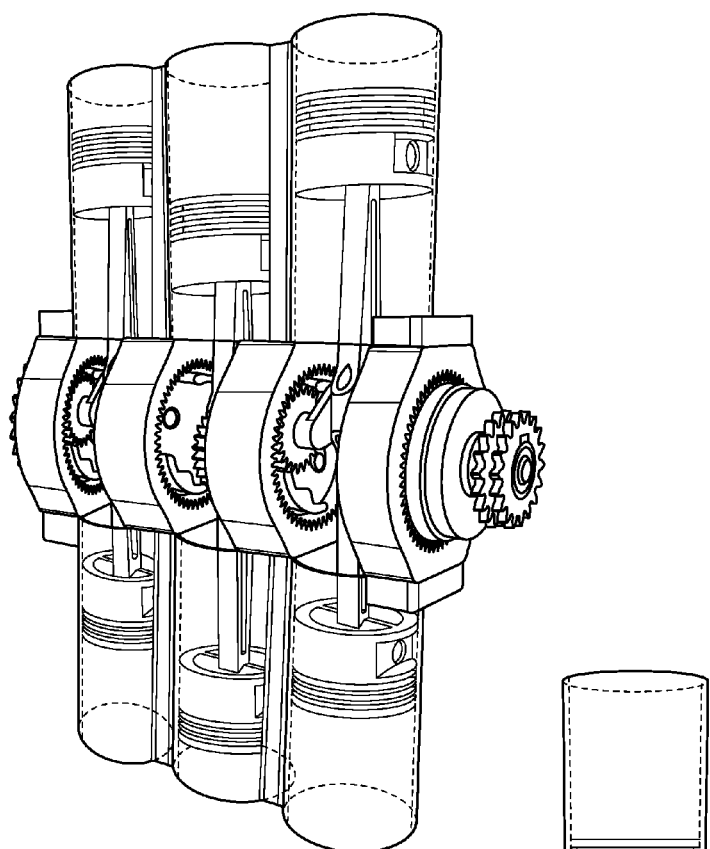
Figure 16F:
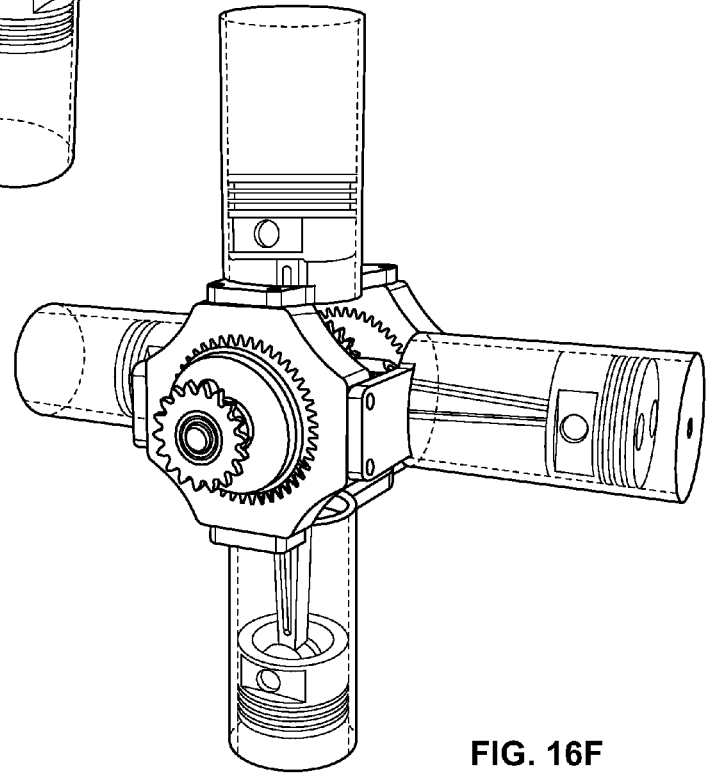
Figure 16G:
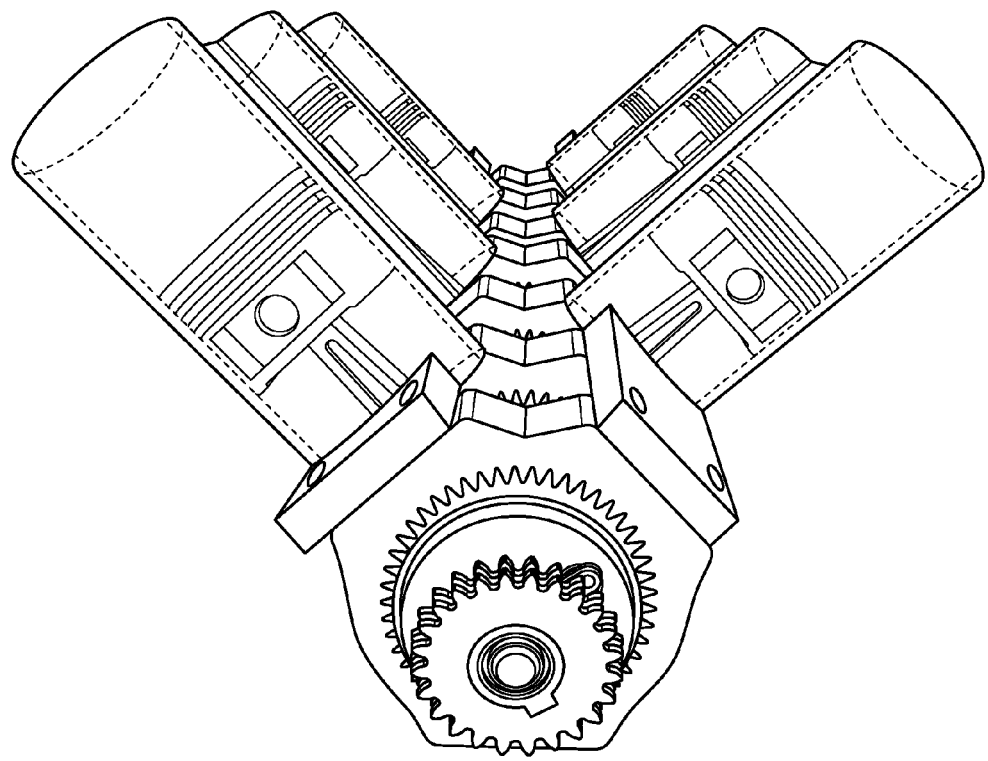

Conventional engines may be constructed according to an array of different designs, including single, in-line, opposed, and V-Type designs. FIGS. 16(A)-(G) show exemplary embodiments that are equivalent counterparts to known conventional engines. FIG. 16(A) shows an exemplary embodiment including a single cylinder, as described above. FIG. 16(B) shows an exemplary in-line engine having four cylinders arranged, one after the other, in a straight line. Due to the perfect linear motion of the piston 6 and the connecting rod 5 in the exemplary embodiments, a second cylinder can be easily added to the same crank pin journal 4, with two pistons connected with one connecting rod and firing consecutively, as shown in FIG. 16(C). Other exemplary embodiments are comparable to Boxer/Flat engines with multiple pistons that all move in the horizontal plane, as shown in FIG. 16(D) with four cylinders and FIG. 16(E) with six cylinders. FIG. 16(F) shows an exemplary X-engine configuration having two reciprocating assemblies for a total of four pistons coupled to each crank pin bearing a crankshaft, in a manner similar to a conventional X-engine. An exemplary V-type engine may have two rows of cylinders set normally at a 90-degree angle to each other, as shown in FIG. 16(G).

It should be understood that the embodiments of the invention described herein are merely exemplary and that a person skilled in the art may make many variations and modifications without departing from the spirit and scope of the invention. All such variations and modifications are intended to be included within the scope of the invention as defined in the appended claims.

What is claimed is:

1. A gearset, comprising:
   a fixed internal ring gear having a pitch diameter, a plurality of internal teeth, and a central axis, the plurality of internal teeth comprising a first quantity of teeth;
   a first pinion gear having a pitch diameter, a plurality of teeth and a hole through a central axis thereof, the first pinion gear being disposed within the internal ring gear such that the plurality of teeth of the first pinion gear mesh with the plurality of internal teeth of the internal ring gear, the plurality of teeth of the first pinion gear comprising a second quantity of teeth, the second quantity of teeth being half the first quantity of teeth of the internal ring gear, the pitch diameter of the first pinion gear being half the pitch diameter of the internal ring gear;
   a disc having a substantially circular cross-section, a central axis collinear with the central axis of the internal ring gear, a first side facing toward the internal ring gear, a second side facing away from the internal ring gear, and an output shaft extending from the second side, the output shaft having a central axis that is collinear with the central axis of the disc, the disc being free to rotate about the central axis and restrained from displacement or rotation other than rotation about the central axis, the disc further including at least one slot along a portion of a diameter of the first side of the disc, the at least one slot having a first end, a second end, and a depth that is less than a thickness of the disc;
   a first pinion shaft having a first end and a second end, and extending through the hole of the first pinion gear, the second end of the first pinion shaft engaging the first end of the at least one slot of the disc;
   a second pinion gear having a plurality of teeth and a hole through a central axis thereof, the second pinion gear being disposed within the internal ring gear such that the plurality of teeth of the second pinion gear mesh with the plurality of internal teeth of the internal ring gear, the second pinion gear being axially offset from the first pinion gear such that the plurality of teeth of the second pinion gear do not mesh with the plurality of teeth of the first pinion gear and rotationally offset from the first pinion gear by half a rotation about the internal ring gear, the plurality of teeth of the second pinion gear comprising the second quantity of teeth; and
   a second pinion shaft having a first end and a second end and extending through the hole of the second pinion gear, the second end of the second pinion shaft engaging with the second end of the at least one slot of the disc.

2. The gearset according to claim 1, wherein:
   the first pinion shaft includes a first driving lug extending from the second end thereof, the first driving lug having a diameter that is less than a diameter of the first pinion shaft, a longitudinal axis of the first driving lug being offset from a longitudinal axis of the first pinion shaft by a driving lug offset, and
   the second pinion shaft includes a second driving lug extending from the second end thereof, the second driving lug having a diameter that is equal to the diameter of the first driving lug, a longitudinal axis of the second driving lug being offset from a longitudinal axis of the second pinion shaft by the driving lug offset, wherein only the first driving lug of the first pinion shaft and the second driving lug of the second pinion shaft engage the slot of the disc.

3. The gearset according to claim 2, further comprising:
   a first sliding bearing fitted over the first driving lug; and
   a second sliding bearing fitted over the second driving lug.

4. The gearset according to claim 1, wherein the first end of the first pinion shaft is adapted to be coupled to a crank pin.

5. The gearset according to claim 1, wherein the at least one slot of the disc comprises a first slot and a second slot, wherein the second end of the first pinion shaft engages the first slot, and wherein the second end of the second pinion shaft engages the second slot.

6. The gearset according to claim 1, wherein the disc further comprises a central hole along the central axis thereof extending from the first side through the output shaft.

7. The gearset according to claim 6, further comprising:
   a pinion carrier disposed between the fixed internal ring gear and the disc and having a first side facing toward the fixed internal ring gear, a second side facing toward the disc, a central axis collinear with the central axis of the disc, and a shaft extending from the second side along the central axis into the hole of the disc.

8. The gearset according to claim 7, wherein the pinion carrier is free to rotate about the central axis thereof and restrained from displacement or rotation other than rotation about the central axis thereof.

9. The gearset according to claim 8, wherein the pinion carrier further includes a first hole and a second hole, and wherein, when the pinion carrier rotates about the central axis thereof, the first hole remains aligned with the first pinion shaft and the second hole remains aligned with the second pinion shaft.

10. The gearset according to claim 1, wherein the fixed internal ring gear is fixed to a crankcase of an engine block.

11. A crank gear system, comprising:
a piston cylinder having a vertical axis;
a piston disposed within the piston cylinder for reciprocal movement along the vertical axis, the reciprocal movement having a stroke length;
a connecting rod extending from the piston along the vertical axis from a first end to a second end, the connecting rod being fixed to prevent rotation thereof away from the vertical axis;
a rotatable crankshaft having a crank pin journalled at the second end of the connecting rod, a first pinion shaft extending away from the crank pin in a first direction along a horizontal axis that is perpendicular to the vertical axis of the piston cylinder, and a second pinion shaft extending away from the crank pin in a second direction along the horizontal axis, the first pinion shaft and second pinion shaft being offset from the crank pin such that reciprocal movement of the piston produces rotation of the first pinion shaft and second pinion shaft about the horizontal axis;
a first gearset coupled to the first pinion shaft and a second gearset coupled to the second pinion shaft, each of the first and second gearsets coupled:
a first pinion gear having a plurality of teeth and a hole through a central axis thereof, the first pinion gear being mounted on a corresponding one of the first and second pinion shafts, the plurality of teeth comprising a first quantity of teeth,
an internal ring gear that is fixed with respect to the piston cylinder, the internal ring gear having a plurality of teeth, and a central axis parallel to the horizontal axis, the plurality of teeth of the internal ring gear comprising a second quantity of teeth that is twice the first quantity of teeth, the first pinion gear being disposed within the internal ring gear such that the plurality of teeth of the first pinion gear mesh with the plurality of internal teeth of the internal ring gear,
a disc having a substantially circular cross-section, a thickness, a central axis collinear with the central axis of the internal ring gear, a first side facing toward the internal ring gear, a second side facing away from the internal ring gear, a slot along a portion of a diameter of the first side of the disc, and an output shaft extending from the second side of the disc, the output shaft having a central axis that is collinear with the central axis of the disc, wherein the corresponding one of the first and second pinion shafts extends through the first pinion gear to engage with a first end of the slot of the disc,
a second pinion gear having a plurality of teeth and a hole through a central axis thereof, the second pinion gear being disposed within the internal ring gear such that the plurality of teeth of the second pinion gear mesh with the plurality of teeth of the internal ring gear, the second pinion gear being axially offset from the first pinion gear such that the plurality of teeth of the second pinion gear do not mesh with the plurality of teeth of the first pinion gear and rotationally offset from the first pinion gear by half a rotation about the internal ring gear, the plurality of teeth of the second pinion gear comprising the first quantity of teeth, and
an idler pinion shaft extending through the hole of the second pinion gear from a first end to a second end, the second end engaging with a second end of the slot of the disc.

12. The crank gear system of claim 11, wherein:
the first pinion shaft has a first end proximate to the crank pin, a second end engaged with the slot of the disc of the first gearset, and a first driving lug extending from the second end thereof, the first driving lug having a diameter that is less than a diameter of the first pinion shaft, a longitudinal axis of the first driving lug being offset from a longitudinal axis of the first pinion shaft by a driving lug offset,
the second pinion shaft has a first end proximate to the crank pin, a second end engaged with the slot of the disc of the second gearset, a second driving lug extending from the second end thereof, the second driving lug having a diameter that is less than a diameter of the second pinion shaft, a longitudinal axis of second first driving lug being offset from a longitudinal axis of the first pinion shaft by the driving lug offset,
wherein only the first driving lug of the first pinion shaft and the second driving lug of the second pinion shaft engage the first ends of the slots of the corresponding discs.

13. The crank gear system of claim 12, wherein of each of the idler pinion shafts has a driving lug extending from the second end thereof, and wherein only the driving lug of each of the idler pinion shafts engages with the second ends of each of the slots.

14. The crank gear system of claim 13, further comprising:
a first sliding bearing fitted over the driving lug of the first pinion shaft;
a second sliding bearing fitted over the driving lug of the second pinion shaft;
a third sliding bearing fitted over the driving lug of the idler pinion shaft of the first gearset; and
a fourth sliding bearing fitted over the driving lug of the idler piston of the second gearset.

15. The crank gear system of claim 12, wherein a crank length between the crank pin and the first pinion shaft is equal to one fourth of the stroke length of the piston.

16. The crank gear system of claim 15, wherein a length of the driving lug offset is in the range of one tenth to one half of the crank length.

17. The crank gear system of claim 11, wherein a pitch diameter of each of the internal ring gears is equal to the stroke length of the reciprocal movement of the piston.

18. The crank gear system of claim 17, wherein a pitch diameter of each of the first pinion gears is half of the pitch diameter of each of the internal ring gears, and wherein a pitch diameter of each of the second pinion gears is half of the pitch diameter of each of the internal ring gears.

* * * * *